(12) United States Patent
Sundaresan et al.

(10) Patent No.: US 9,337,966 B2
(45) Date of Patent: May 10, 2016

(54) CARRIER AGGREGATION

(71) Applicant: NEC Laboratories America, Inc., Princeton, NJ (US)

(72) Inventors: Karthikeyan Sundaresan, Princeton, NJ (US); Sampath Rangarajan, Princeton, NJ (US)

(73) Assignee: NEC Corporation (JP)

( * ) Notice: Subject to any disclaimer, the term of this patent is extended or adjusted under 35 U.S.C. 154(b) by 329 days.

(21) Appl. No.: 13/947,015

(22) Filed: Jul. 19, 2013

(65) Prior Publication Data
US 2014/0161058 A1    Jun. 12, 2014

Related U.S. Application Data

(60) Provisional application No. 61/675,511, filed on Jul. 25, 2012.

(51) Int. Cl.
*H04L 5/00* (2006.01)
*H04W 72/04* (2009.01)

(52) U.S. Cl.
CPC .......... *H04L 5/001* (2013.01); *H04W 72/0453* (2013.01); *Y02B 60/50* (2013.01)

(58) Field of Classification Search
CPC ........ H04L 5/008; H04L 5/001; H04L 5/0058
See application file for complete search history.

(56) References Cited

U.S. PATENT DOCUMENTS

| | | | |
|---|---|---|---|
| 7,583,939 B2 * | 9/2009 | Mehta et al. | 455/91 |
| 8,514,691 B2 * | 8/2013 | Berggren et al. | 370/206 |
| 8,639,239 B2 * | 1/2014 | Uemura et al. | 455/423 |
| 8,644,224 B2 * | 2/2014 | Iwamura | 370/328 |
| 8,797,978 B2 * | 8/2014 | Li | H04L 5/0007 370/329 |
| 8,798,636 B2 * | 8/2014 | Rao | 455/452.1 |
| 8,811,268 B2 * | 8/2014 | Kim et al. | 370/319 |
| 8,995,393 B2 * | 3/2015 | Siomina et al. | 370/331 |
| 9,155,081 B2 * | 10/2015 | Seo | H04L 5/001 |
| 2011/0151887 A1 * | 6/2011 | Hakola et al. | 455/452.2 |
| 2013/0003580 A1 * | 1/2013 | Kovacs et al. | 370/252 |

OTHER PUBLICATIONS

R. Ratasuk et al., "Carrier Aggregation in LTE Advanced", IEEE VTC, May 2010.

L. Garcia et al., "Autonomous Component Carrier Selection: Interference Management in Local Area Environments for LTE-Advanced", IEEE Communications Magazine, Sep. 2009.

A. Li et al., "Search Space Design for Cross-Carrier Scheduling in Carrier Aggregation of LTE-Advanced System", IEEE ICC, Jun. 2011.

R. Ratasuk, D. Tolli, and A. Ghosh, "Carrier aggregation in lte advanced," in IEEE VTC, May 2010.

(Continued)

*Primary Examiner* — Gregory Sefcheck
(74) *Attorney, Agent, or Firm* — Joseph Kolodka

(57) ABSTRACT

A method implemented in a mobile communications system is disclosed. The method includes selecting primary component carrier $c_p$ for a new user according to a formula, and performing joint secondary CC selection for one or more Long Term Evolution (LTE)-Advanced users and resource scheduling for one or more LTE users and said one or more LTE-Advanced users. Other methods, systems, and apparatuses also are disclosed.

12 Claims, 13 Drawing Sheets

(56) References Cited

OTHER PUBLICATIONS

L. Garcia, K. Pedersen, and P. Mogensen, "Autonomous component carrier selection: Interference management in local area environments for lte-advanced," in IEEE Communications Magazine, Sep. 2009.

A. Li, K. Takeda, N. Miki, Y. Yan, and H. Kayama, "Search space design for cross-carrier scheduling in carrier aggregation of lte-advanced system," in IEEE ICC, Jun. 2011.

\* cited by examiner

CARRIER AGGREGATION

This application claims the benefit of U.S. Provisional Application No. 61/675,511, entitled "Energy Efficient Carrier Aggregation for LTE-Adv Systems," filed on Jul. 25, 2012, the contents of which are incorporated herein by reference.

BACKGROUND OF THE INVENTION

The present invention relates to carrier aggregation and, more particularly, to secondary component carrier allocation.

Carrier aggregation (CA) is an important feature of LTE-advanced that allows its users to aggregate up to 100 MHz of (dis-)contiguous spectral chunks to provide increased data rates. While the conventional approach of allowing LTE-adv users to be configured on all component carriers, results in maximum diversity gain for scheduling, it also increases the users' power consumption and processing that scale with the number of component carriers. We argue that it is possible to operate the LTE-adv users on a small subset of component carriers to reduce their energy consumption, without any appreciable loss to the scheduling gain. A step in realizing this goal however, is to address the joint problem of component carrier selection as well as scheduling.

We highlight the hardness of the joint problem when the number of component carriers that can be activated for a LTE-adv user is limited. Towards solving the problem, we consider various models that incorporate contiguous/dis-contiguous CA as well as backlogged/finite buffers and propose efficient, greedy algorithms with performance guarantees that are also simple to implement. Our evaluations based on LTE simulation parameters, reveal that our algorithms help realize 80-90% of the maximum scheduling gain with just half the component carriers and provide 15-25% throughput gain over conventional load and signal power (RSRP) based carrier selection schemes.

The conventional approach of allowing LTE-adv users to be configured on all component carriers, results in maximum diversity gain for scheduling. However, it also increases the users' power consumption and processing that scale with the number of component carriers.

The proliferation of mobile devices and the exponential growth of mobile data traffic has increased the demand for higher data rates from next generation cellular networks like LTE-advanced, WiMAX, etc. In addition to OFDMA being employed as the air interface in all these technologies, several other features such as small cells, carrier aggregation, etc. are being considered. While small cells increase the area spectral efficiency and are a key to increasing the system capacity, several challenges remain in realizing them in practice. On the other hand, carrier aggregation provides an immediate, effective solution for network operators to repurpose spectrum from older technologies (eg. 2/3G to 4G) and aggregate fragmented spectral allocations to deliver higher data rates.

Carrier aggregation (CA) can be of multiple types as shown in FIG. 1(a). Component carriers (CC, spectral chunks) can be aggregated dis-contiguously either within a band (intra-band) or across bands (inter-band), but contiguously only within a band (intra-band). While CA is supported only by LTE adv users, LTE-adv (release 10 onwards) itself allows for backward compatibility with release 8/9 users that operate on only one CC. For every user, a CC is configured to be the primary CC (PCC) that is responsible for key operations such as location registration, RRC (re-)establishment, etc. and hence cannot be changed dynamically. On the other hand, the additional CCs (secondary CCs) in CA can be (de-)activated dynamically for LTE-adv users.

In the conventional approach, where LTE-adv users are configured with all available CCs, the selection of CCs is restricted to the choice of PCC for each user, with the remaining CCs serving as SCCs. Due to the nature of operations on PCC, its selection is decoupled from scheduling and determined semi-statically based on load-balancing or reference signal received power (RSRP). While activating LTE-adv users on all CCs provides maximum diversity gain through scheduling, it also increases the energy consumption and processing at the user (device)—factors that scale with the number of CCs activated. Hence, we posit the following question: Is it possible to operate the LTE-adv users on a small subset of component carriers to reduce their energy consumption, without any appreciable loss to the scheduling gain? Given the plethora of network interfaces and applications being housed by smart mobile devices and their consequent impact on battery drainage, understanding the answer to the above question is both important and timely.

We answer in the affirmative and argue that it is indeed possible to operate the LTE-adv users on a small subset of CCs without an appreciable loss to scheduling performance. Note that selection of secondary CCs (SCCs) for LTE adv users now becomes an integral component and directly impacts scheduling performance. Given that SCCs can be (de-)activated dynamically, a key to keeping the loss in performance small, is to integrate and couple CC selection with scheduling and address them jointly for LTE-adv users. Towards addressing this goal and hence seeking an answer to our motivating question, we make the following contributions:

- We prove the hardness of the coupled problem of CC selection and scheduling when the number of CCs that can be activated for a LTE-adv user is limited.
- Towards solving the problem, we consider various models that incorporate contiguous(C)/dis-contiguous(D) CA as well as backlogged(B)/finite(F) user buffers and propose efficient, greedy algorithms with performance guarantees that are also simple to implement. Specifically, our algorithms yield approximation guarantees of $\frac{1}{2}$, $\frac{1}{4}$, $\frac{1}{2}$, and $\frac{1}{3}$ for the models DB, DF, CB and CF respectively.
- Our evaluations based on LTE simulation parameters, reveal that our algorithms help realize 80-90% of the maximum scheduling gain with just half the component carriers and provide 15-25% throughput gain over conventional load-based and RSRP-based carrier selection schemes.

Our results are promising and indicate that with the help of efficiently designed joint CC selection and scheduling algorithms for LTE-adv users, it is possible to realize close-to the full performance benefits of CA (achieved with all CCs), while expending only a fraction of the user energy.

Existing solutions [1, 2, 3] restrict the number of component carriers for a user by load balancing users on different component carrriers (CCs). However, since the allocation of specific CCs to users is done independent of scheduling, it comes at the expense of diversity gain and throughput performance.

REFERENCES

[1] R. Ratasuk, D. Tolli, and A. Ghosh, "Carrier aggregation in lte advanced," in IEEE VTC, May 2010.

[2] L. Garcia, K. Pedersen, and P. Mogensen, "Autonomous component carrier selection: Interference management in local area environments for lte-advanced," in IEEE Communications Magazine, September 2009.

[3] A. Li, K. Takeda, N. Miki, Y. Yan, and H. Kayama, "Search space design for cross-carrier scheduling in carrier aggregation of lte-advanced system," in IEEE ICC, June 2011.

BRIEF SUMMARY OF THE INVENTION

An objective of the present invention is to aim to jointly performed CC selection for users along with their resource scheduling. This helps determine the limited but appropriate set of CCs for each user. While energy consumption is lowered due to the reduced use of CCs, diversity gain and hence throughput performance is also not very sacrificed in the process.

An aspect of the present invention includes a method implemented in a mobile communications system. The method comprises selecting primary component carrier $c_p$ for a new user according to formula $$c_p = \mathrm{argmax}_c \frac{r_{avg,c}}{l_c},$$

where $(r_{k,c}^{avg}$, is reference signal received power (RSRP) averaged over a spectrum for user k on component carrier c, and performing joint secondary CC selection for one or more Long Term Evolution (LTE)-Advanced users and resource scheduling for one or more LTE users and said one or more LTE-Advanced users.

Another aspect of the present invention includes a mobile communications system. The mobile communications system comprises a first selection unit to select primary component carrier $c_p$ for a new user according to formula $$c_p = \mathrm{argmax}_c \frac{r_{avg,c}}{l_c},$$

where $(r_{k,c}^{avg}$, is reference signal received power (RSRP) averaged over a spectrum for user k on component carrier c, and a performance unit to perform joint secondary CC selection for one or more Long Term Evolution (LTE)-Advanced users and resource scheduling for one or more LTE users and said one or more LTE-Advanced users.

DETAILED DESCRIPTION

We provide a light-weight (low complexity) solution for joint CC selection and scheduling for LTE-advanced users. This allows for both better throughput performance of LTE-advanced users while incurring only a fraction of the energy compared to conventional schemes. Further, the low complexity nature of the solutions allow for easier realization at the base stations.

II. System Description

A. Carrier Aggregation

To provide high data rates to next generation mobile devices, it becomes in-dispensable for network operators to aggregate several fragmented spectral chunks—a process referred to as carrier aggregation (CA). While CA and hence our contributions are common to next generation technologies (LTE-A, WiMAX) in general, we will describe them in the context of the more popular one, namely LTE-A.

Figure 1A:
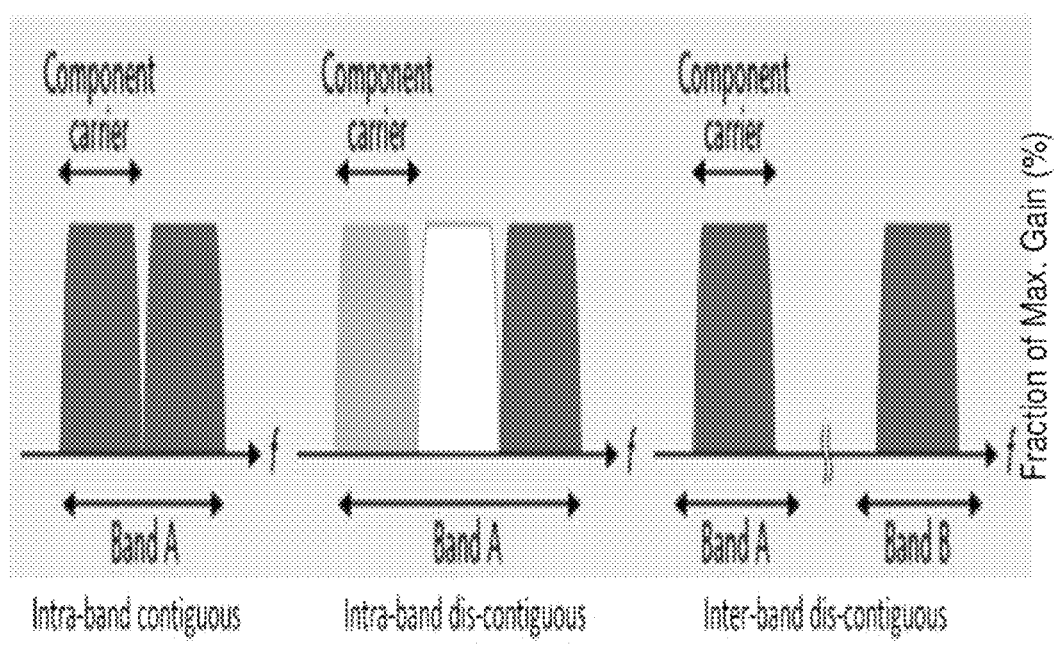
FIG. 1 depicts (a) types of CA and (b) dis-contiguous CA with 10 LTE-adv users.

CA can be of multiple types as shown in FIG. 1(a). Contiguous or dis-contiguous component carriers (CC) within a band (intra-band) can be aggregated, while only dis-contiguous CCs can be aggregated across bands (inter-band) by definition (for eg. CCs in 700 MHz and 2 GHz). LTE-A (3GPP release 10 onwards) allows for up to 5 CCs of 20 MHz maximum bandwidth to be aggregated, thereby allowing for LTE-A users to operate with 100 MHz spectrum. LTE-A provides backward compatibility with LTE (3GPP release 8/9) users that operate on only one CC. For every user, when it first (re-)establishes a radio control connection, a CC configured to be its primary CC (PCC). The PCC can then be used to configure additional CCs called secondary CCs (SCCs) that are accessible to LTE-A users. Unlike the PCC, the SCCs can be (de-)activated dynamically for LTE-A users during carrier aggregation using a bitmap.

Note that, the power consumption per user increases with the number of CCs (bandwidth size) it has to receive and process for control and data information (not just link measurements). Thus, while configuring a LTE-A user with all CCs will provide maximum scheduling diversity gain by allowing the user to be scheduled on any of the resource blocks in all CCs, it will also incur the maximum power consumption. Similarly, while contiguous CA might offer lower scheduling diversity compared to dis-contiguous CA, it will also potentially incur lower power consumption since its implementation can be realized with a single FFT module and a RF component unlike the latter. Hence, the RRM (radio resource management) process in LTE-A incorporates a new feature called CC configuration, whereby each LTE-A user can be configured to operate on a specific set of CCs.

B. Motivation

Given the multitude of interfaces and applications running on smart mobile devices and their power-hungry nature, configuring the LTE-A users (using CC configuration feature) to operate on a limited set of SCells to save power appears to be a natural solution. However, such energy savings will have to come at the cost of scheduling performance. Hence, a key question we try to address in this work is whether it is possible to save on LTE-A users' power consumption without an appreciable loss in scheduling performance?

Figure 1B:
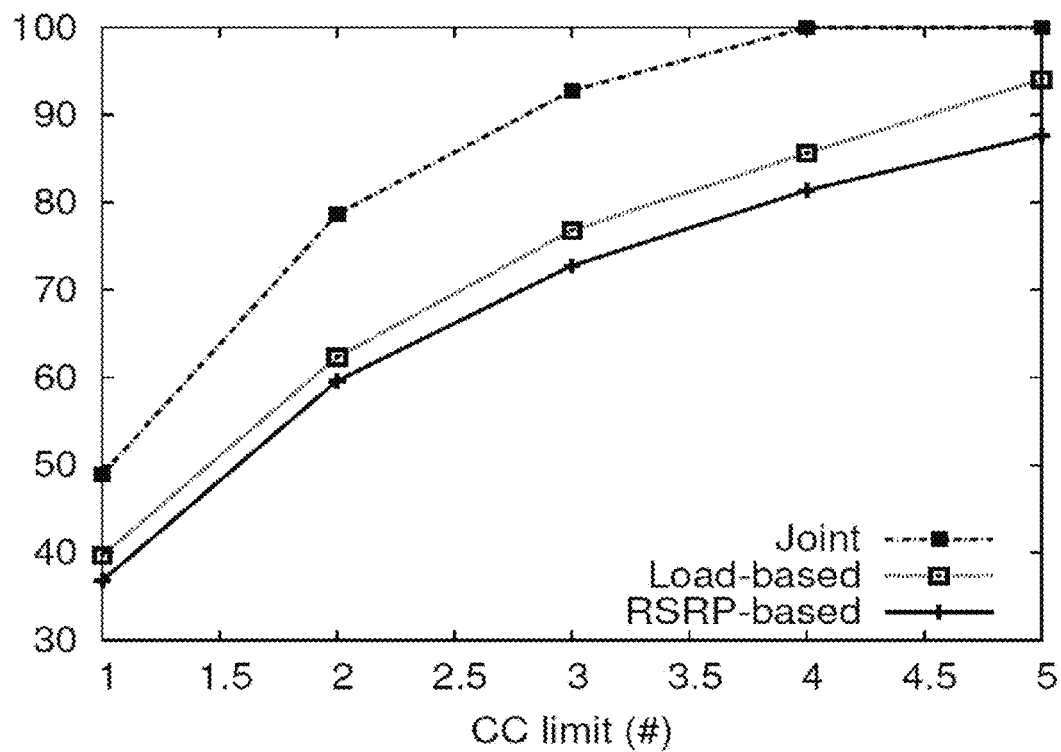

Current approaches to CA configure a PCC based on load and user capabilities (decoupled from scheduling), while allowing all remaining CCs to be used as SCCs, purely from the perspective of maximizing scheduling diversity gain. Hence, to understand the tradeoff between scheduling diversity gain and power consumption reduction, we study the fraction of the maximum (aggregate) scheduling throughput that can be achieved when the number of CCs configured for LTE-A users is limited (compared to five CCs allowed in release 10). For this purpose, we consider two baselines, where we apply the PCC selection criteria to SCC selection as well (i.e. based on user load on CCs or average reference signal received power (RSRP) of CCs), thereby decoupling the latter from scheduling. We compare them against an integrated scheme, where selection of SCCs is determined jointly with scheduling. The performance of these schemes (algorithms employed explained in subsequent sections) is compared against an optimal scheme that allows for access to all CCs for LTE-A users. The result in FIG. 1(b) clearly illustrates two points: (i) 80-90% of the maximum scheduling gain can be achieved with just half the CCs, namely 2-3 CCs, and (ii) to keep the loss in scheduling performance minimal while saving on user power, one needs to carefully pick the SCCs by integrating the SCC selection process with scheduling. This in turn motivates us to address the joint problem of SCC selection and scheduling for a limited number of CCs in this work.

C. Related Work

Carrier aggregation, being one of the recent advancements incorporated in LTE-A, is slowly garnering attention from the research community, which provides an overview of the various options and features associated with CA in LTE-A and how it would coexist with legacy LTE users. RRM (scheduling) in OFDMA networks with carrier aggregation has been studied recently in the past couple of years. In a system-level evaluation of CA, CC selection is restricted to only PCC based on load-balancing and LTE-A users are allowed to use all CCs. CA is employed to alleviate interference in heterogeneous networks (macrocells and femtocells), where CCs can be selected autonomously by different networks so as to alleviate interference. There is a problem of search space design (mapping) for control information signaling in CA with cross-CC scheduling. Another step is to extend MIMO scheduling in LTE to work with CA. To the best of our knowledge, existing works thus far have not looked at the problem of configuring LTE-A users on a subset of CCs for energy efficiency purposes, wherein the joint problem of CC selection and scheduling becomes important and challenging.

III. Scheduling with Carrier Aggregation

Recall that there are two aspects to CC selection: PCC (semi-static) selection that is common to both LTE (Rel 8/9) and LTE-A users and SCC (dynamic) selection that is specific to LTE-A users. While our focus is on the joint (dynamic) SCC selection (for LTE-A users) and scheduling (all users), we do need to specify how the PCCs are chosen first as this impacts the remaining set of SCCs available for each user.

A. PCC Selection

The choice of PCC is made either based on user load or received signal power (RSRP) on the CCs in existing schemes.

Load-based: The CC that has the smallest number of users ($l_c$) configured on it thus far is chosen as the PCC for a given user k ($P_k = \arg\min_c l_c$).

RSRP-based: The CC that yields the highest average RSRP ($r_{k,c}^{avg}$, averaged over the spectrum) for a given user (k) is chosen as its PCC ($P_k = \arg\max_c r_{k,c}^{avg}$).

The load-based scheme allows for load balancing and utilization of all CCs but is agnostic to the rates seen by the users on the CCs, while the roles are reversed for the RSRP-based scheme. Hence, to strike a balance between the two factors, we employ PCC selection based on the following metric:

$$c_p = \arg\max_c \frac{r_{avg,c}}{l_c}.$$

B. Joint SCC Selection and Scheduling

1) Scheduling Model: We consider a downlink, OFDMA system as in LTE, where data transmissions occur in frames. Every downlink frame is a two-dimensional structure of symbols and sub-channels. Resource allocations to users are made in the granularity of resource blocks (RBs), where an RB spans multiple sub-channels and all symbols in the frame.

The objective of our scheduling algorithms is to maximize the end-to-end system throughput subject to the popular proportional fairness (PR) model ($\max \Sigma_k \beta_k \log \bar{r}_k$), where $\beta_k$ captures the priority weight of user's QoS class and $\bar{r}_k$ its average throughput. The system solution can be shown to converge to the optimum PF allocation at longer time scales if the base station (BS) scheduler's decisions at each frame are made to maximize the aggregate marginal utility, $S_{max} = \arg\max_s \{\Sigma_{k \in S} \Delta U_k\}$. $\Delta U_k$ denotes the marginal utility received by user k in a feasible schedule S and is given by $$\frac{\beta_k r_k^{CA}}{\bar{r}_k}$$

for PF, where $r_k^{CA}$ is the instantaneous rate received by the user in the frame in the presence of carrier aggregation.

Thus, at each frame t, user weight $$v_k(t) = \frac{\beta_k}{\bar{r}_k(t)}$$

varies with $\bar{r}_k(t)$ and accounts for both fairness and QoS. The scheduling problem at the BS then reduces to determining the frame schedule that maximizes the following aggregate weighted rate subject to desired CA and resource allocation constraints.

$$S_{max}(t) = \arg\max_S \sum_{k \in S} v_k(t) \cdot r_k^{CA}(t) \quad (1)$$

2) Problem Formulation: The rate received by a user in a frame ($r^{CA}$) depends on the set of RBs allocated to it and the rate obtained on those RBs. This in turn depends on the type of the user (LTE or LTE-A) as well as the CCs assigned to it. While the PCCs are pre-determined for all users (Sec. III-A), we still need to address the joint problem of SCC selection (for LTE-A users with limited number of CCs) and scheduling (for all users), which can be formally stated as follows.

$$SCA: \text{Maximize} \sum_k v_k \sum_{c \in C} \sum_{m \in M} y_{k,m,c} x_{k,c} r_{k,m,c}$$

$$\text{s.t.} \sum_c x_{k,c} \leq \{n, 1\}, \forall k \in \{LTE\text{-}A, LTE\}$$

$$\sum_k y_{k,m,c} x_{k,c} \leq 1, \forall m, c$$

$$\sum_{c,m} y_{k,m,c} x_{k,c} r_{k,m,c} \leq B_k, \forall k$$

$$x_{k,c} = 1, \text{ if } x_{k,c-1} \cdot x_{k,c+1} = 1, \forall c, k \in LTE\text{-}A$$

$x_{k,c}$ and $y_{k,m,c}$ are indicator variables indicating the allocation of CC c to user k and the allocation of RB m in CC c to user k (whose corresponding rate is $r_{k,m,c}$)respectively. C and $\mathcal{M}$ represent the set of CCs and RBs in each CC, with $|C|=N$ and $|\mathcal{M}|=M$.

The first constraint limits the total number of CCs that can be allocated to LTE-A and LTE users to n and 1 respectively. Note that one of the CCs will be pre-assigned (PCC selection, $x_{k,P_k}=1$) for all users. Hence, SCCs need to be selected only for LTE-A users. The second constraint captures the conflict-free assignment of RBs in each CC to users. The third constraint is specific to the case, where users have finite data buffers ($B_k$, corresponding to short-lived data sessions) that limits their net rate allocation. The final constraint is specific to the case, where LTE-A users must be allocated contiguous CCs (for contiguous CA). While this constraint reduces the scheduling flexibility in contiguous CA compared to dis-contiguous CA, it allows for lower power consumption in the former since its implementation can be realized with a single FFT module and a RF component unlike the latter. Thus, depending on the nature of CA (contiguous, C or dis-contiguous, D) and user buffers (backlogged, B or finite, F), we can have four models under which the problem can be addressed, namely DB, FB, CB and CF.

While the current fairness model between LTE-A and LTE users is based on net throughput (over al CCs), we discuss how our proposed algorithms and guarantees would also apply to an alternate model favoring LTE-A users by considering per-CC fairness.

C. Problem Hardness

Theorem 3.1: SCA1 is NP-hard to solve.

We consider a simpler instance of the problem (SCA), namely with backlogged buffers and CC limit n=1, which is a special case of all the four models BD, BC, FD, FC. We prove its hardness by giving a polynomial-time reduction from the edge-2-colorable problem, thereby automatically establishing the hardness of the four models.

Given the hardness of our problem, we will now focus on designing efficient algorithms with approxi-mation guarantees that are also easy-to-implement for each of the four models in subsequent sections.

IV. Dis-Contiguous Carrier Aggregation

In discontiguous CA, users are not constrained in picking CCs that are contiguous.

A. Backlogged User Buffers

Given a PCC assignment for each user (Sec. III-A), we need to select SCCs for LTE-A users as well as assign RBs in CCs to all the users (subject to their CC assignment) so as to maximize our objective of weighted sum rate. Considering users with backlogged user buffers makes it easier to handle the problem, where we can focus on users that provide the best rate on each RB without any buffer under-flow concerns. However, the hardness still remains, due to the limit on the number of CCs that can be assigned to users. We propose the following greedy algorithm (GCA-BD) to address the problem.

---

Algorithm 1 Greedy Scheduler for SCA-BD: GCA-BD

1: Input: CC limit n; PCC List $\mathcal{P} = \{(k, P_k)\}, \forall k$; rate $r_{k,m,c}, \forall k, m, c$
2: $\mathcal{K} \leftarrow \mathcal{K}_{lteA} \cup \mathcal{K}_{lte}; \mathcal{K}_{lteA}' \leftarrow \{1,\ldots,|\mathcal{K}_{lteA}|\}, \mathcal{K}_{lte} \leftarrow \{|\mathcal{K}_{lteA}'|+1, \ldots, |\mathcal{K}|\}; S \leftarrow \emptyset$
3: Define $\mathcal{K}_{lteA}' \leftarrow \{k_l : k \in [1, |\mathcal{K}_{lteA}|], l \in [1, n-1], k_l = k, \forall l$
4: Define $\phi_u \leftarrow \{(u,c) : c \in [1, N]\} \mathcal{P}, \forall u \in \mathcal{K}_{lteA}'$
5: while $\mathcal{K}_{lteA}' \neq \emptyset$ do
6: $\quad f(S) = \Sigma_c \Sigma_{m=1}^{M} \max_{u:(u,c) \in S \cup \mathcal{P}} \{v_u r_{u,m,c}\}$

---

Algorithm 1 Greedy Scheduler for SCA-BD: GCA-BD

7: $\quad f(S \cup (u', c')) = \Sigma_{c,m} \max_{u:(u,c) \in S \cup \mathcal{P} \cup (u',c')} \{v_u r_{u,m,c}\}$
8: $\quad (u^*, c^*) = \arg\max_{(u',c') \in \phi_u : u' \in \mathcal{K}_{lte}'} \{f(S \cup (u',c')) - f(S)\}$
9: $\quad S \leftarrow S \cup (u^*, c^*); \mathcal{K}_{lteA}' \leftarrow \mathcal{K}_{lteA}' \setminus u^*; \phi_u \leftarrow \phi_u \setminus (u, c^*), \forall u = u^*$
10: end while
11: $k_{m,c}^* = \arg\max_{k:(k,c) \in S \cup \mathcal{P}} \{v_k r_{k,m,c}\}, \forall m, c$

---

From the given set of LTE-A users ($\mathcal{K}_{lteA}$) a virtual user set ($\mathcal{K}'_{lteA}$) is formed, where each LTE-A user is replicated n−1 times, where n is the limit on the number of CCs (including PCC) that can be assigned to it (steps 2,3). Now the problem reduces to selecting one CC (other than PCC, from $\phi_u$) for each user (u) in ($\mathcal{K}'_{lteA}$) step 4). This in turn is determined greedily by finding the user-CC pair that yields the highest marginal utility (steps 6-8). Since users have backlogged buffers, the utility of an assignment amounts to finding the best weighted rate on each RB in a CC based on the users who are assigned to that CC and aggregating them (steps 6,7). Also note that, while we are determining CC assignments to LTE-A users, the utilities are determined accounting for both SCC and PCC assignments as well as LTE-A and LTE users ($\mathcal{P} \cup \mathcal{P}$). Once a user-CC pair is selected, the remaining set of LTE-A users that require SCC assignment is updated (step 9) and the procedure repeats till all SCC assignments to LTE-A users are made (steps 5-10). Then, based on the final assignment of PCC and SCCs, the allocation of RBs to users in each CC can be easily computed (step 11). The bulk of the time complexity comes from step 8, which runs in O(KNMn). This along with the while loop that runs $|\mathcal{K}_{lteA}|$n times, results in a net time complexity of $O(K^2 n^2 NM)$.

We will now establish an approximation guarantee for Algorithm GCA-BD. Since most of our algorithms leverage sub-modular maximization to provide performance guarantees, we first present some relevant definitions in this regard.

Partition Matroid: Consider a ground set $\Psi$ and let S be a set of subsets of $\Psi$. S is a matroid if, (i) $\emptyset \in S$, (ii) If $A \in S$ and $B \subseteq A$, then $B \in S$, and (iii) If $A, B \in S$ and $|A| > |B|$, there exists an element $x \in A \setminus B$, such that $B \cup \{x\} \in S$. A partition matroid is a special case of a matroid, wherein there exists a partition of $\Psi$ into components, $\phi_1, \phi_2, \ldots$ such that $A \in S$ if and only if $|A \cap \phi_i| \leq 1, \forall i$.

Sub-modular function: A function $f(\cdot)$ on S is said to be sub-modular and non-decreasing if $\forall x, A, B$ such that $A \cup \{x\} \in S$ and $B \subseteq A$ then, $$f(A \cup \{x\}) - f(A) \leq f(B \cup \{x\}) - f(B)$$

$$f(A \cup \{x\}) - f(A) \geq 0, \text{ and } f(\emptyset) = 0$$

Theorem 4.1 GCA-BD's worst case performance is within ½ of the optimum.

Proof: The sub-optimality of maximizing a non-decreasing, sub-modular function over a partition matroid using a greedy algorithm of the form $x = \arg\max_{x \in \phi_j} f(A \cup \{x\}) - f(A)$ every iteration was shown to be bounded by ½ in [13]. We will now show that GCA-BD is such an algorithm, with our scheduling objective corresponding to a non-decreasing, sub-modular function to obtain the desired result.

Let the ground set be composed of following tuples.

$$\Psi = \{(u,c) : \forall u \in \mathcal{K}'_{lteA}, c \in [1,N]\} \setminus \mathcal{P} \qquad (2)$$

Now $\Psi$ can be partitioned into $\phi_u = \{(u,c) : \forall c \in [1,N]\} \setminus \mathcal{P}$. Let S be defined on $\Psi$ as a set of subsets of $\Psi$ such that for all subsets $A \in S$, we have (i) if $B \subseteq A$, then $B \in S$; (ii) if element $x \in A \setminus B$, then $Q \cup \{x\} \in S$; and (iii) $|A \cap \phi_u| \leq 1, \forall u$. This means that S is a partition matroid. Since the limit of SCCs on each LTE-A user has been translated to that of one CC for every virtual user in $\mathcal{K}'_{lteA}$; the above conditions enable any A∈S to provide a feasible schedule. This allows S (a partition matroid) to capture all feasible schedules and hence our scheduling problem. Our scheduling objective is given as, $$f(A) = \sum_{c \in C} \mu_c(A);$$

$$\text{where, } \mu_c(A) = \sum_{m=1}^{M} \max_{u:(u,c) \in A \cup \mathcal{P}} \{v_u r_{u,m,c}\}$$

It can be seen that if $B \subseteq A$, then $\mu_i(B) \leq \mu_i(A)$. Further, the difference between A and B is that some CCs have more users assigned to them in A than in B. Hence, when a new user u is added on CC c, the marginal gain the user can contribute to c is potentially less in A than in B. Hence, for an element (u,c) such that $A \cup \{(u,c)\}$ forms a valid schedule, it follows that $f(A \cup \{(u,c)\}) - f(A) \leq f(B \cup \{(u,c)\}) - f(B)$. Note that although the scheduler focuses only on SCC selection for LTE-A users, f(A) incorporates the utility of both SCC assignments to LTE-A users as well as PCC assignment to all users. Since the utility of the schedule corresponding only to the PCC allocation of all users is fixed (constant) and does not impact the SCC selection of LTE-A users (due to backlogged buffers), removing it from f(A) would allow for normalization (f(∅)=0). This establishes that the function f(A) is indeed sub-modular and non-decreasing. Further, our scheduling problem aims to maximize this non-decreasing, sub-modular function over a partition matroid. Thus, by picking the user-CC pair yielding the highest marginal utility in f(A) in every iteration (steps 6-8), GCA-BD incurs a sub-optimality of ½ that follows from the result.

B. Finite User Buffers

A key difference with respect to backlogged buffers is that the rate on a RB in a CC for a user is dependent on its own as well as other users' prior allocations as they affect the remaining data in its buffer. We propose an algorithm (Algorithm GCA-FD) that considers all users (not just LTE-A) and assigns SCCs to LTE-A users sequentially in the sense that all SCC assignments to a user are completed before moving to another user. As we will show later, such an approach is crucial in establishing a performance guarantee for the algorithm.

---

Algorithm 2 Greedy Scheduler for SCA-FD: GCA-FD

1. Input: CC limit n; PCC List $\mathcal{P} = \{(k, P_k)\}, \forall k$; rate $r_{k,m,c}$, $\forall k, m, c$; Buffer limit $B_k$, $\forall k$
2. $\mathcal{K} \leftarrow \mathcal{K}_{lteA} \cup \mathcal{K}_{lte}; \mathcal{K}_{lteA} \leftarrow \{1, \ldots, |\mathcal{K}_{lteA}|\}, \mathcal{K}_{lte} \leftarrow \{|\mathcal{K}_{lteA}| + 1, \ldots, |\mathcal{K}|\}; \mathcal{S} \leftarrow \emptyset$
3. Define $\phi_u \leftarrow \{(u, \vec{c}_u): \forall u \in \mathcal{K}\}$;
   $\vec{c}_u' = <c_{u,1}, \ldots, c_{u,n-1}>, c_{u,j} \in [1,N] \setminus P_u, \forall u \in \mathcal{K}_{lteA}$;
   $\vec{c}_u = P_u, \forall u \in \mathcal{K}_{lte}$
4. for $k \in [1, |\mathcal{K}|]$ do
5.   for u ∉ S & u ∈ $K_{lteA}$ do
6.     for j ∈ [1, n − 1] do
7.       $c_{u,j} = \arg\max_{c \notin <c_{u,1},\ldots,c_{u,j-1}> \cup P_u} \{f(\mathcal{S} \cup (u, <c_{u,1},\ldots,c_{u,j-1},c>)) - f(\mathcal{S} \cup (u, <c_{u,1},\ldots,c_{u,j-1}>))\}$
8.     end for
9.   end for
10.   $(u, \vec{c}_u)^* = \arg\max_{u \notin \mathcal{S}} \{f(\mathcal{S} \cup (u, \vec{c}_u)) - f(\mathcal{S})\}$
11.   $\mathcal{S} \leftarrow \mathcal{S} \cup (u, \vec{c}_u)^*$
12. end for

---

Algorithm 2 Greedy Scheduler for SCA-FD: GCA-FD

13. Compute f($\mathcal{S}$) to obtain RB allocation in each CC.
14.
15. Computing f($\mathcal{S}'$)
16. Let $D_k = B_k, \forall k \in \mathcal{K}$; $\mathcal{A} = \emptyset$; U = 0
17. For i ∈ [1, NM] do
18.   $(u^*, m^*, c^*) = \arg\max_{u,m,c:(m,c) \notin \mathcal{A}_{u},(u,c) \in \mathcal{S}' \cup \mathcal{P}} \{v_u \min\{r_{u,m,c}, D_u\}\}$
19.   $U = U + \min\{r_{u^*,m^*,c^*}, D_{u^*}\}; D_{u^*} = D_{u^*} - \min\{r_{u^*,m^*,c^*}, D_{u^*}\}$;
     $\mathcal{A} \leftarrow \mathcal{A} \cup (m^*, c^*)$
20. end for
21. Return U

---

The algorithm comprises of three and two levels of decision making for LTE-A and LTE users respectively, which can be explained in a top-down approach for easier exposition. At the highest level, it picks the user with its CC assignment ($\vec{c}_u$: n−1 SCCs for LTE-A user, 1 fixed PCC $P_u$ for all users; step 3) that yield the highhest marginal utility in each iteration (steps 10-11). However, to compute this, we need to first determine the assignment of n−1 SCCs if the user is an LTE-A user, of which there are exponential (in n) possibilities. Hence, the second level of decision making (only for LTE-A users) is to determine the assignment of SCCs for each un-assigned LTE-A user, which in turn is accomplished iteratively for a fixed user by picking the SCC that yields the highest marginal utility (steps 6-8). However, note that, utility is always computed with respect to the entire current allocation (to all users) and not just specific to the given user. Now, computing the utility with respect to a single SCC assignment to a user involves determining the allocation of RBs to users based on the current CC allocations and is still a hard problem due to the finite buffer constraints of users. This leads us to the third level of decision making (common to all users), whereby given an assignment of CCs to users and their finite buffers, we iteratively pick an RB in a CC along with a user allocation that yields the highest marginal utility (steps 15-21).

Thus, back-tracking the three levels of decision-making, the algorithm determines the assignment of CCs to a user in each iteration. Note that although PCC is fixed for LTE users, the order in which LTE users are picked by the scheduler impacts the assignment of SCCs to LTE-A users. Once the CC assignment to all users is complete, the RB allocation in each CC can be obtained by computing the utility corresponding to the final assignment (step 13). While the for loops (steps 4-12) run in $O(K^2Nn)$, the core component of utility computation in each iteration (steps 15-21) runs in $O(N^2M^2K)$, resulting in a net time complexity of $O(K^3N^3M^2n)$.

In establishing a performance guarantee for GCA-FD, we will invoke nested sub-modularity, and leverage the following result from [1], [2].

Lemma 4.1 If the incremental oracle is only a—approximable, then the approximation guarantee of greedy submodular maximization changes to $$\frac{\alpha}{p+\alpha},$$

where the maximization is subject to a p—independence system.

We now have the following result.

Theorem 4.2 GCA-FD provides an approximation guarantee of ¼.

Proof. The proof is based on nested sub-modularity, where we will show that the three levels of decision making in GCA-FD correspond to three sub-modular maximization (SM) problems, each nested within the other.

Level 1: Specifically, at the highest level, we have the following SM problem.

$$\Psi = \{(u, \langle c_{u,1}, \ldots, c_{u,n-1} \rangle ): \forall u \in \mathcal{K}_{lteA}, \forall c_{u,j} \in [1,N] \setminus P_u\}$$

$$\cup \{(u, P_u): \forall u \in \mathcal{K}_{lte}\}$$

$$\phi_u = \{(u, \langle c_{u,1}, \ldots, c_{u,n-1} \rangle ): \forall c_{u,j} \in [1,N] \setminus P_u\}, \text{ if } u \in \mathcal{K}_{lteA}$$

$$= \{(u, P_u)\}, \text{ if } u \in \mathcal{K}_{lte}$$

Now, the set of all feasible schedules S (tuples of user and CC assignments) would correspond to a partition matroid of $\Psi$, whereby there can be at most only one element from each $\phi_u$ for any A∈S (for LTE users the element is fixed). Note that, while PCC is given for all users, it is still considered as an element for LTE users to include them in scheduling. Further, the scheduling objective function, $$f(A) = \sum_{k \in \mathcal{K}} \mu_k(A)$$

corresponds to the aggregate user utility resulting from the given CC assignment in A as well as finite user buffers. Now, it can be seen that, $$f(A \cup (u, \vec{c}_u)) - f(A) \leq f(B \cup (u, \vec{c}_u)) - f(B), \text{ where, } B \subseteq A$$

Since one user is considered at a time, when more elements (users, A\B) are added to A, some of the existing CCs will have more users in A than in B. This in turn reduces the contribution of a new element to A more than to B. In addition to being non-decreasing, incorporating all users in the CC assignment process allows for normalizing f(f(∅)=0)—although the PCC assignment for LTE users is fixed, it impacts the SCC assignment for LTE-A users due to finite buffer scheduling. Thus, our scheduling objective function is non-decreasing and sub-modular on S. Note that considering all SCC assignments to a LTE-A user before moving to another user is crucial for sub-modularity to hold with finite buffers—otherwise, existing users whose allocations are replaced on some RBs by a new user, will have their freed up data available for later allocations that could result in a higher marginal utility. Since GCA-FD employs a greedy algorithm (step 10) to maximize this non-decreasing, SM objective, its sub-optimality would be bounded by ½ [13], provided we can optimally compute the incremental function (step 10), $$\underset{u \notin A}{\operatorname{argmax}} \{f(A \cup (u, \vec{c}_u)) - f(A)\} \quad (3)$$

Level 2: Computing the above incremental oracle is a hard problem in itself, with an additional level of hardness arising from the exponential number of SCC assignments possible for an LTE-A user. GCA-FD approximates it using the following SM problem for each LTE-A user.

$$\Psi_u = \{(u_1, c), \ldots, (u_{n-1}, c) : \forall c \in [1,N]\} \setminus \mathcal{P}$$

with, $\phi_{u_j} = \{(u_j, c): \forall c \in [1,N]\} \setminus \mathcal{P}$ where the user u is replicated n−1 times ($u_j$=u, j∈[1, n−1]). Now the set of all feasible schedules $S_u$ (tuples of user and CC) for user u forms a partition matroid of $\Psi_u$. With f($A_u$) ($A_u \in S_u$) representing the same objective function as before, we can claim that $$f(A_u \cup (u_j, c)) - f(A_u) \leq f(B_u \cup (u_j, c)) - f(B_u)$$

where $B_u \subseteq A_u$. This is because, when a new CC is available for user u (assume u's buffer is already used up without loss of generality), we can move some of u's allocation on RBs in existing CCs to the new one, provided we have additional un-used buffer for other users in A for these vacated RBs. Now by adding a CC later in the schedule, we run the risk of using up more of the remaining buffer of other users in A during replacement on other CCs that were added prior to it. Hence, u's ability to replace RBs in the new CC and increase utility is reduced if added later in the schedule, resulting in f being sub-modular on $S_u$. Further, f is non-decreasing and can be normalized to the utility prior to the consideration of user u. Now GCA-FD employs a greedy algorithm (step 7) to maximize this non-decreasing, SM objective. However, computing the incremental oracle arg $\max_{u_j,c}\{f(A_u \cup (u_j, c)) - f(A_u)\}$ in level 2 still remains a hard problem since it involves determining the optimal allocation of RBs to users in CCs, subject to the CC assignment in $A_u \cup (u_j,c)$ as well as finite user buffers, which brings us to the final level.

Level 3: Computing the incremental oracle in level 2 (level 1) for LTE-A (LTE) users is an extension (to multiple CC) of the RB allocation problem considered in [16] for a single CC with finite user buffers. Hence, its hardness follows from the hardness of the problem in [16]. GCA-FD approximates the problem using the following SM problem given the CC assignment and finite buffers of all users.

$$\Psi' = \{(u,c,m): \forall (u,c) \in A \cup \mathcal{P}, m \in [1,MJ]\}$$

with, $\phi_{c,m} = \{(u,c,m): u \in A \cup \mathcal{P}\}$

Now the set of all feasible schedules S' (RB allocations) for a given CC assignment to users forms a partition matroid of $\Psi'$. The scheduling objective for any A'∈S' is given as, $$f(A') = \sum_{u \in A' \cup \mathcal{P}} \mu_u(A')$$

$$\text{where, } \mu_u(A') = v_u \min \left\{ \sum_{(c,m):(u,c,m) \in A'} r_{u,m,c}, B_u \right\}$$

It is easy to see that $f(A' \cup (u,c,m)) - f(A') \leq f(B' \cup (u,c,m)) - f(B')$, where, $B' \subseteq A'$ since the assignment of an RB on a CC to a user later in the schedule will bring potentially lesser utility due to reduced buffer availability (from prior RB allocations). Now, the greedy algorithm in GCA-FD that maximizes this non-decreasing, SM objective (step 18) would directly yield an approximation of ½ since f(A') can be computed optimally.

Since the incremental oracle in level 2 can be solved with ½ approximation (from level 3), using the result from lemma 4.1 and applying p=1 for matroids, we obtain that level 2 itself can be solved with $$\frac{1/2}{1+1/2} = \frac{1}{3}$$

approximation. However, since level 2 solves the incremental oracle for level 1, we obtain the final approximation for level 1 and hence the whole algorithm as $$\frac{1/3}{1+1/3} = \frac{1}{4}.$$

V. Contiguous Carrier Aggregation

Constraining users with contiguous CC assignment helps energy efficiency but reduces the flexibility in diversity scheduling. However, it also reduces the number of assignment possibilities for a user, thereby simplifying the assignment problem.

A. Backlogged Buffers

With the PCC already assigned to users, the assignment of SCC to LTE-A users may now be contiguous as well as include the PCC. Hence, there are at most only N−n+1 such contiguous CC combinations for every LTE-A user. We now propose the following algorithm (GCA-BC). The algorithm is similar to the one for discontiguous CA with backlogged butlers (GCA-BD) with the following difference. Instead of assigning one SCC at a time, we now assign all SCCs jointly to a user, owing to the limited number of contiguous CC configurations that include the PCC (N−n+1 combinations, step 3). Hence, at each iteration, we select a user with his n CC assignment that yields the highest marginal utility (steps 5-7). Once all users have received their CC assignments, we allocate the RBs in CCs to users yielding ---
Algorithm 3 Greedy Scheduler for SCA-BC: GCA-BC
---

1: Input: CC limit n; PCC List $\mathcal{P} = \{(k, P_k)\}$, ∀k; rate $r_{k,m,c}$, ∀k, m, c
2: $\mathcal{K} \leftarrow \mathcal{K}_{lteA} \cup \mathcal{K}_{lte}$;
   $\mathcal{K}_{lteA} \leftarrow \{1, \ldots, |\mathcal{K}_{lteA}|\}, \mathcal{K}_{lte} \leftarrow \{|\mathcal{K}_{lteA}|+1, \ldots, |\mathcal{K}|\}; \mathcal{S} \leftarrow \emptyset$
3: Define $\phi_u \leftarrow \{(u, [c, c+n-1]) : P_u \in [c, c+n-1], c \in [1, N-n+1]\}, \forall u \in \mathcal{K}_{lteA}$
4: while $\mathcal{K}_{lteA} \neq \emptyset$ do
5: $\quad f(\mathcal{S}) = \Sigma_c \Sigma_{m=1}^M \max_{u:(u,c) \in \mathcal{S}} \{v_u r_{u,m,c}\}$
6: $\quad f(\mathcal{S} \cup (u', [c_u', c_u'+n-1])) =$
   $\Sigma_c \Sigma_{m=1}^M \max_{u:(u,[c_u,c_u+n-1]) \in \mathcal{S} \cup (u',[c_u',c_u'+n-1])} \{v_u r_{u,m,c}\}$
7: $\quad (u^*, [c^*, c^*+n-1]) = \arg\max_{(u',[c',c'+n-1]) \in \phi_{u'}:u' \in \mathcal{K}_{lteA}}$
   $\{f(\mathcal{S} \cup (u', [c', c'+n-1])) - f(\mathcal{S})\}$
8: $\quad \mathcal{S} \leftarrow \mathcal{S} \cup (u^*,[c^*, c^*+n-1]); \mathcal{K}_{lteA} \leftarrow \mathcal{K}_{lteA} \setminus u^*$
9: end while
10: $k_{m,c}^* = \arg\max_{k:(k,c) \in \mathcal{S} \cup \mathcal{P}} \{v_k r_{k,m,c}\}$, ∀m, c

--- the highest weighted rate on that RB and assigned to that CC (step 10). The bulk of the complexity comes from step 7, where the marginal utility calculation for a given new user assignment on n CCs incurs O(nM), with O(K(N−n+1)) such assignments possible, resulting in O(KNMn). This coupled with O(K) iterations, results in a net complexity of O(K²NMn). The limited number of contiguous CC assignments results in a factor n complexity reduction compared to the discontiguous CA case.

Theorem 5.1: GCA-BC provides an approximation guarantee of ½.

Proof: The proof is similar to that of GCA-BD, for a slightly different definition of partition matroid.

Define the ground set as follows.

$$\Psi = \{(u,[c,c+n-1]):P_u \in [c,c+n-1],$$

$$\forall c \in [1,N-n+1], u \in \mathcal{K}_{lteA}\}$$

$$\phi_u = \{(u,[c,c+n-1]):P_u \in [c,c+n-1], c \in [1,N-n+1]\}$$

Now, the set of all feasible schedules S (tuples of user and contiguous CC assignments) would correspond to a partition matroid of Ψ, whereby there can be at most only one element from each φu for any A∈S. Further, our scheduling objective function, $f(A) = \Sigma_{c \in C} \mu_c(A)$, where $$\mu_c(A) = \sum_m \max_{k:(k,c) \in A \cup \mathcal{P}} \{v_k r_{k,m,c}\} \quad (4)$$

can be shown to be non-decreasing and sub-modular on S using an argument similar to that in the backlogged buffer case, and can be computed optimally. Hence, the result.

B. Finite Buffers

Our algorithm for contiguous CA with finite buffers (GCA-FC) is similar to its discontiguous counter-part, namely GCA-FD, with the following difference: the exponential number of discontiguous CC assignments to every user now reduces to just N−n+1 contiguous CC assignments. This reduces the 3 levels of decision making in GCA-FD to 2 levels in GCA-FC for all users. The first level remains to be the selection of the user with its CC assignment (SCCs for LTE-A user, 1 fixed PCC for all users) that yields the highest marginal utility in each iteration (steps 4-7). However, the second level of determining the set of SCCs in an assignment to the LTE-A user (steps 5-9 in GCA-FD) is completely bypassed given the fixed number of contiguous CC assignments (step 3). This directly leads us to the third level, where for a given assignment of CCs to users and their finite buffers, we iteratively pick an RB in a CC along with a user allocation that yields the highest marginal utility (similar to steps 15-21 in GCA-FD). The utility computation itself runs in O(N²M²K) as before, of which there are O(KN) user-CC assignments possible to select from. This along with K iterations, results in a net time complexity of O(K³N³M²). Once again, restricting to contiguous CC assignments brings in a complexity reduction factor of n (compared to GCA-FD).

---
Algorithm 4 Greedy Scheduler for SCA-FD: GCA-FC
---

1: Input: CC limit n; PCC List $\mathcal{P} = \{(k, P_k)\}$, ∀k ; rate $r_{k,m,c}$, ∀k, m, c; Buffer limit $B_k$, ∀k
2: $\mathcal{K} \leftarrow \mathcal{K}_{lteA} \cup \mathcal{K}_{lte}; \mathcal{K}_{lteA} \leftarrow \{1, \ldots, |\mathcal{K}_{lteA}|\}, \mathcal{K}_{lte} \leftarrow \{|\mathcal{K}_{lteA}|+1, \ldots, |\mathcal{K}|\}; \mathcal{S} \leftarrow \emptyset$
3: Define $\phi_u \leftarrow \{(u, \vec{c}_u) : \forall u \in \mathcal{K}\}$;
   $\vec{c}_u' = [c, c+n-1] : P_u \in [c, c+n-1], c \in [1, N-n+1]\}, \forall u \in \mathcal{K}_{lteA}; \vec{c}_u = P_u, \forall u \in \mathcal{K}_{lte}$
4: while $\mathcal{K} \neq \emptyset$ do
5: $\quad (u, \vec{c}_u)^* = \arg\max_{(u,c_u') \in \phi_u : u \in \mathcal{K}} \{f(\mathcal{S} \cup (u, \vec{c}_u)) - f(\mathcal{S})\}$
6: $\quad \mathcal{S} \leftarrow \mathcal{S} \cup (u, c_u')^*; \mathcal{K} \leftarrow \mathcal{K} \setminus u^*$
7: end while
8: Compute f(S) to obtain RB allocation in each CC (similar to GCA-FD).

---

Theorem 5.2: GCA-FC provides an approximation guarantee of ₃⅓.

Proof: The proof is along the lines of that for GCA-FD. The ground set however, incorporates only contiguous CC assignments.

$$\Psi = \{(u,[c,c+n-1]): \forall u \in \mathcal{K}_{lteA}, P_u \in [c,c+n-1],$$

$$\forall c \in [1,N-n+1]\} \cup \{(u,P_u): \forall u \in \mathcal{K}_{lte}\}$$

$$\phi_u = \{(u,[c,c+n-1]): P_u \in [c,c+n-1],$$

$$\forall c \in [1,N-n+1]\}, \text{if } u \in \mathcal{K}_{lteA}$$

$$= \{(u,P_u)\}, \text{if } u \in \mathcal{K}_{lte}$$

The definitions of Ψ and $\phi_u$ are essentially subsets of those in the discontiguous case, where all possible SCC combinations were allowed. Hence, the rest of the arguments for sub-modularity hold good given that the objective function is the same. However, unlike GCA-FD, we have only one level of nested sub-modularity. The computation of the incremental oracle (in step 5) amounts to the determination of RB allocations to users given their CC assignment and finite buffers. Latter being a non-decreasing SM problem, results in a half approximation, which in turn results in a net approximation of $1/2/(1+1/2)=1/3$ (using lemma 4.1) for the complete algorithm.

VI. Performance Evaluation

A. Set-Up

System Parameters: A frame-level simulator written in C++ is considered for evaluation of the proposed algorithms. A single-cell OFDMA downlink system based on LTE-A is considered, with a cell radius of 600 m. BS operates at $P_{BS}=35$ dBm power. MS are uniformly distributed within the cell. The Okumura-Hata urban path loss model is employed and coupled with log-normal shadowing and fast (Rayleigh) fading. Each user's Rayleigh channel has a Doppler fading equivalent to a velocity of 3-10 Km/hour. We consider constant bit rate (CBR) applications as the generators of traffic. We consider an LTE-A downlink frame of 1 ms, which consists of two slots (sub-frames) of 0.5 ms each. Each slot consists of 7 symbols. Resource allocations to users are made at the granularity of physical resource blocks (PRB). Each PRB consists of 12 sub-carriers of 15 KHz each. The number of PRBs in the system scales with the available bandwidth (25 for 5 MHz, 50 for 10 MHz, etc.). Of the 14 symbols per frame, 11 are available for data. Given a maximum of five bits (64-QAM) that can be loaded in each symbol, the peak downlink (SISO) data rate for a 5 MHz CC is 16.5 Mbps, which in turn can get boosted to 82.5 Mbps by aggregating 5 such CCs. The rate supported by a user on a RB is obtained by mapping the received SNR at the user to one of the 27 MCS values in LTE-A.

Baselines and Metrics: We compare our proposed algorithms for joint CC selection and scheduling with two baselines: Load-based and RSRP-based, wherein the SCC selection is made based on metrics outlined in Section III-A for PCC selection, while scheduling itself (given a CC assignment) follows the same approach as in our proposed algorithms. The scheduling algorithms are evaluated per frame, where the main metric of evaluation is aggregate network throughput ($Vk=1, \forall k$). The results are averaged over twenty topologies. The limit on the # SCCs, number of users, fraction of LTE users, and user buffers are the parameters of evaluation. The default parameters of operation (when not specified) include a system with: 10 users (all LTE-A users) with backlogged buffers and 5 total CCs (each with 5 Mhz spectrum in the 2.1 GHz band) with a limit of 2 CCs per LTE-A user.

B. Performance of Joint CC Selection and Scheduling

While limiting the number of SCCs helps reduce energy consumption for LTE-A users, we need to understand if the joint CC selection and scheduling will keep the degradation in throughput performance small. We consider the backlogged buffer case, where the problem is optimally solvable when there is no limit on the # CCs (assign all CCs to every LTE-A user). We compare the loss in throughput of our integrated (GRA-BD and GRA-BC) algorithms for discontiguous (dis) and contiguous (con) CA respectively due to limited # CCs against the optimal (allowing for all CCs). The result in FIG. 2(a) clearly shows that our algorithms help achieve 80-90% of the maximum performance in practice (compared to the worst case guarantees of half) while operating on just half the number of CCs. Thus, with the help of efficiently designed algorithms for joint CC selection and scheduling, energy reduction for LTE-A users can be realized without sacrificing any appreciable throughput performance.

Figure 2A:
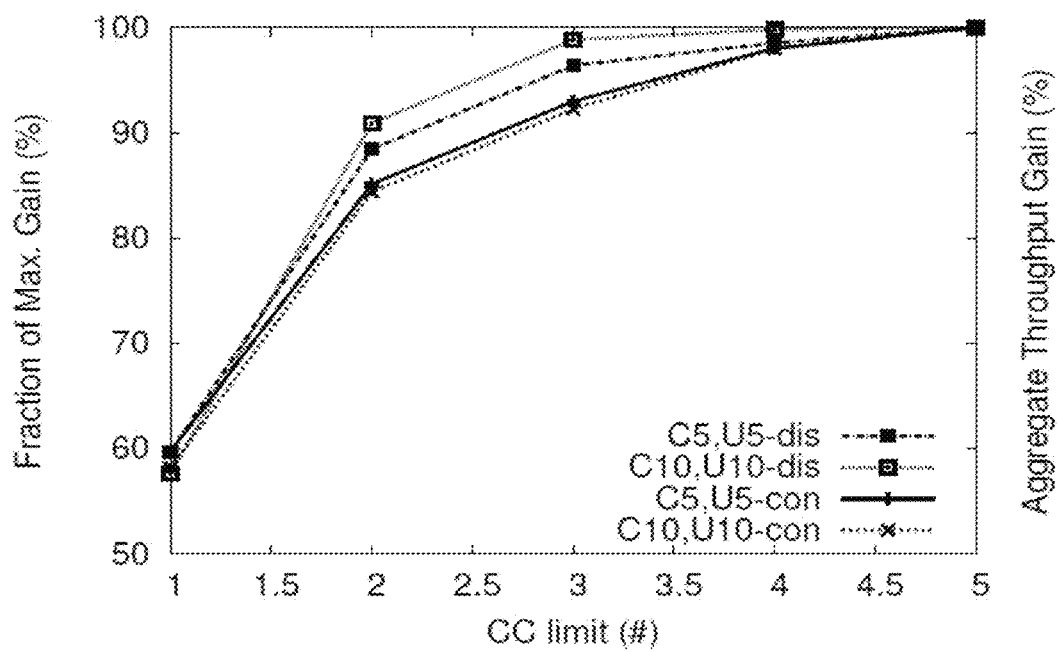
FIG. 2 depicts performance of CA algorithms, especially with regard to (a) an impact of the number of CCs, (b) gain over load-based, (c) gain over RSRP-based, and (d) an impact of the number of LTE-Adv users.
Figure 2B:
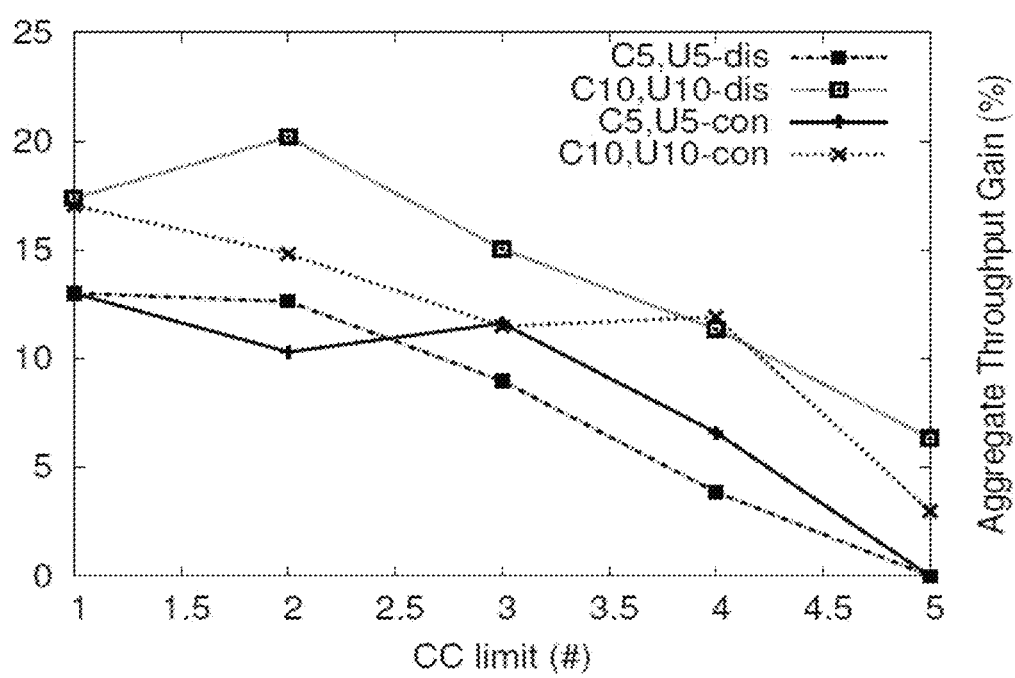
Figure 2C:
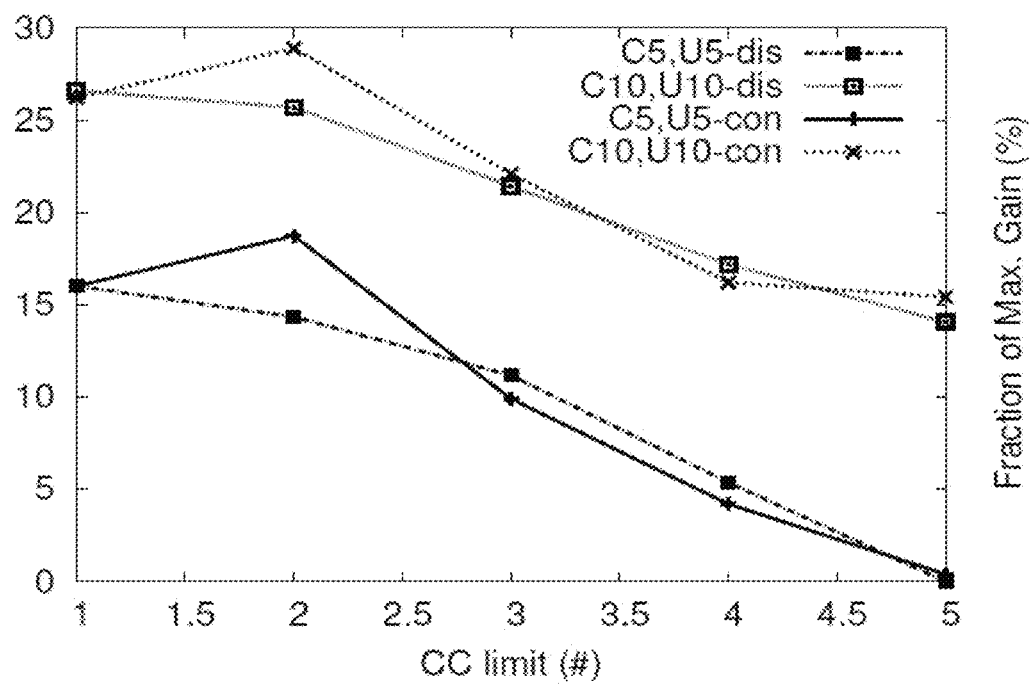

We also evaluate the benefit of integrating CC selection with scheduling by comparing our algorithms against decoupled CC selection and scheduling schemes (Load-based and RSRP-based CC selection) in FIGS. 2(b) and (c). Topologies with five and ten CCs are considered with five and ten LTE-A users respectively. Five observations can be made: (i) In the region of practical interest (limiting CCs to 2-3), we see that gains of 15-30% can be had from integrating CC selection with scheduling; (ii) gains for contiguous CA are slightly inferior to those of discontiguous CA as contiguous CC selection restricts scheduling diversity gain; (iii) gains decrease as the limit on # CCs is relaxed since the need for careful CC selection diminishes in this case; (iv) gains are more over the RSRP-based scheme, indicating that load-balancing users across CCs is relatively more beneficial when CC selection is decoupled from scheduling; and (v) more CCs (10) provides increased room for scheduling diversity and hence higher gains.

Figure 2D:
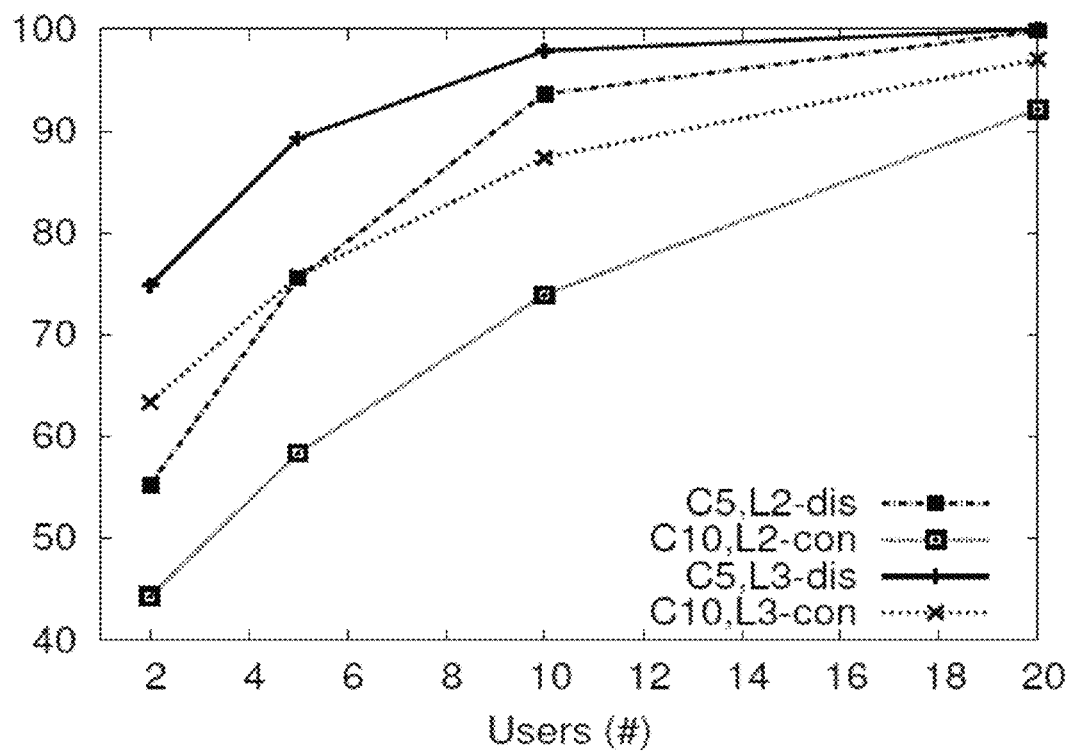

In contrast to FIG. 2(a), we now fix the limit on the # CCs and study the loss in performance as a function of the # users in FIG. 2(d). It can be seen that to keep the loss in performance small, the system needs sufficient scheduling diversity. This can be achieved either with a larger limit on # CCs, or with a larger number of users. Hence, for a total of 5 CCs, a smaller limit (2) on CCs requires more users (10) to achieve over 90% of optimal performance, while a limit of 3 CCs requires only 5 users. Further, contiguous CA reduces the ability to leverage scheduling diversity. This coupled with a larger # of CCs (10), requires either a larger limit (3) on CCs or a larger number of users (20) to achieve over 90% of optimal performance.

C. Impact of User Heterogeneity and Finite Buffers

Figure 3A:
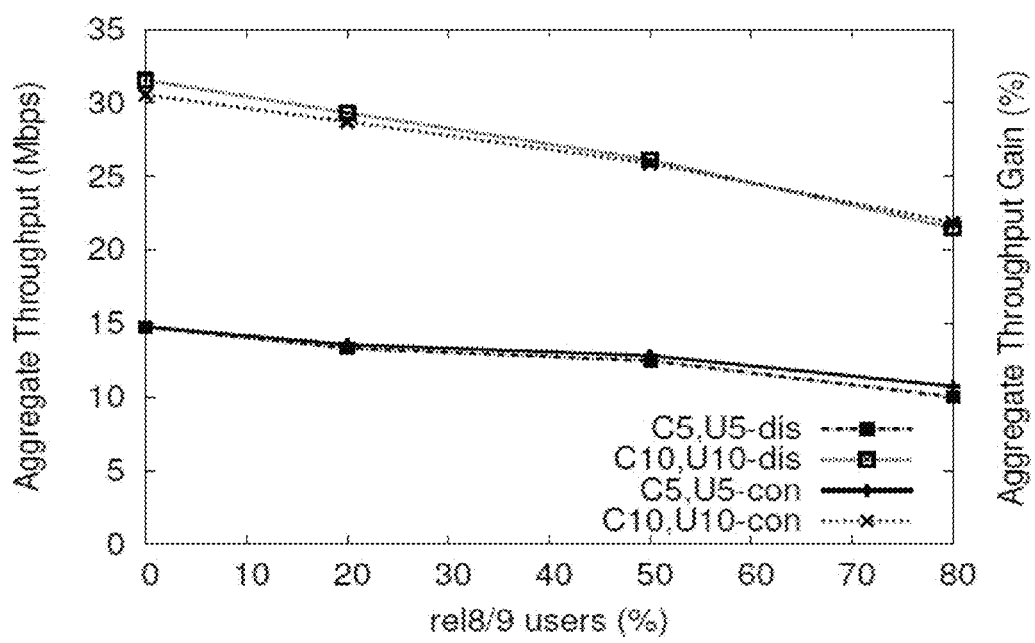
FIG. 3 depicts an impact of Rel 8/9 users and finite buffers, especially with regard to (a) an impact of Rel 8/9 users, (b) gain over load-based, (c) gain over load-based (finite), and (d) gain over RSRP-based (finite).

We study the impact of user heterogeneity (coexistence of LTE-A and LTE users) on the performance of CA as an increasing function of LTE users. The algorithms employed are GCA-BD and GCA-BC for the backlogged buffer case. FIG. 3(a) indicates that when the system transitions from being predominantly LTE-A to predominantly LTE, the loss in performance can be as high as 30%. Access to more CCs allows LTE-A users to provide more scheduling diversity. Note that the loss in performance in FIG. 3(a) is only due to diminishing gain in scheduling diversity across CCs since our fairness model (in scheduling) computes weights only based on net throughput of LTE-A users and not their per-CC throughput. If fairness based on per-CC throughput is employed, then one can expect the loss in performance with increasing number of LTE users to further increase.

Figure 3B:
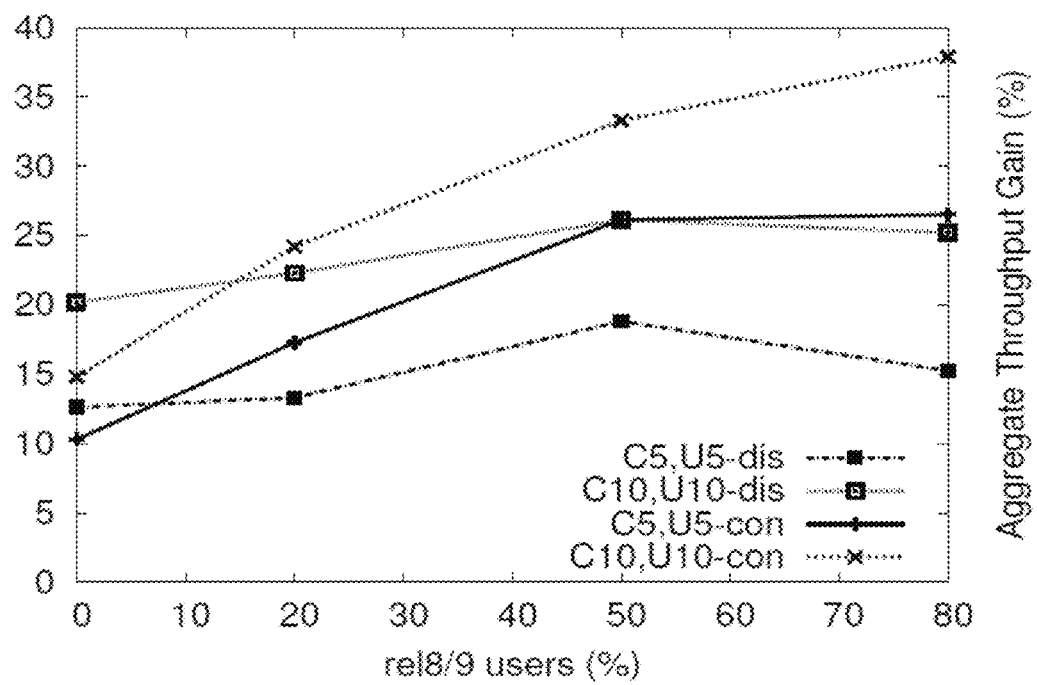

The gain of our algorithms over the load-based scheme is studied as a fraction of the LTE users in the system in FIG. 3(b). Two observations can be made: (i) Irrespective of the fraction of LTE users, gains of 15-20% can be had. This is because our algorithms employ a PCC selection mechanism that incorporates both load and RSRP metrics, along with a joint SCC selection and scheduling scheme. While the impact of the latter component reduces with increasing # of LTE users, the impact of the former component increases as it applies to LTE users; (ii) The gain surprisingly increases with increasing fraction of LTE users for contiguous CA to as high as 25-35%. Recall that the ability to leverage scheduling diversity is lesser with contiguous CA. Hence, when the number of LTE-A users is very small, the need to carefully select their SCCs is all the more pronounced.

Figure 3C:
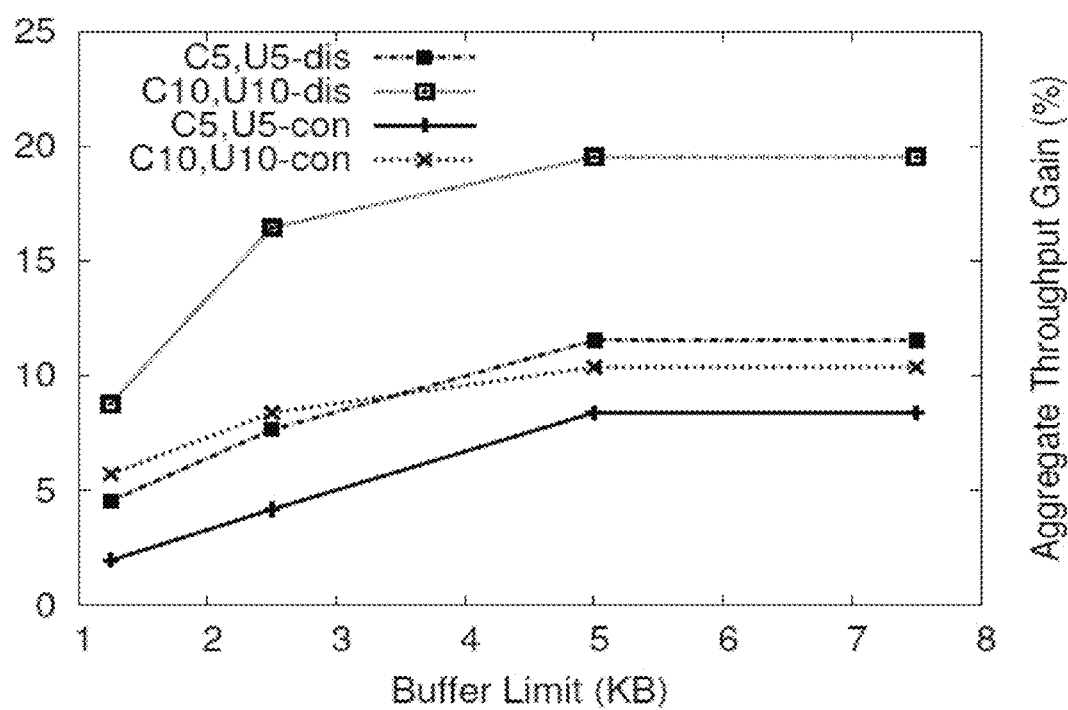
Figure 3D:
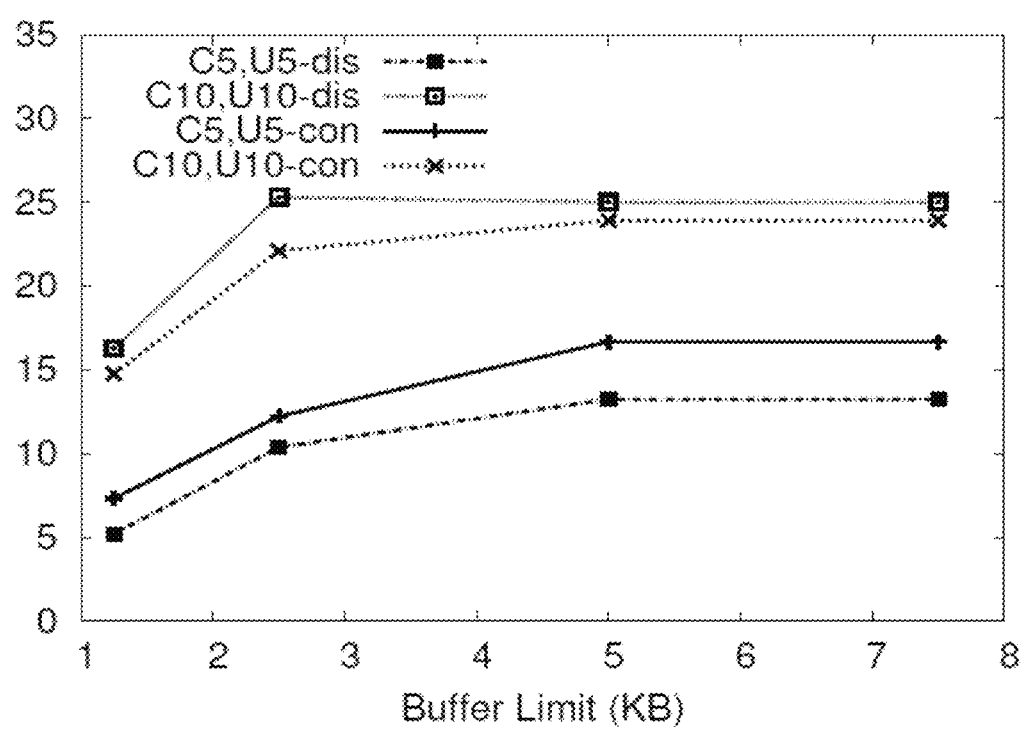

We finally study the impact of finite buffers on our algorithms, GCA-FD and GCA-FC and compare them against the baselines in FIGS. 3(c) and (d). When the amount of user buffer is small, it becomes the performance bottleneck, leaving little room for any performance optimization and gains.

However, as the buffer size increases, there is more room to leverage the increased scheduling diversity gain with CA, resulting in higher gains. The rest of the inferences comparing our algorithms for finite buffer against the baselines are similar to those in the backlogged buffer case.

Figure 4:
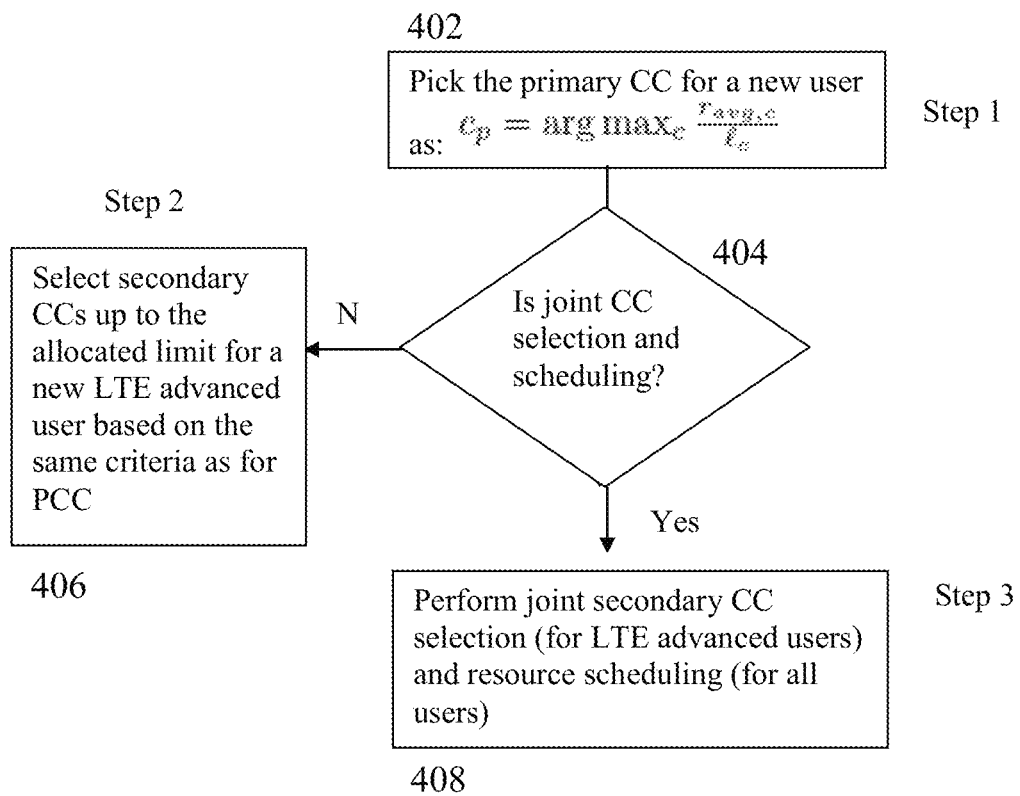
FIG. 4 depicts an approach proposed in this document.

Referring to FIG. 4, the system picks the primary CC for a new user as $$c_p = \text{argmax}_c \frac{r_{avg,c}}{l_c}$$

in step 1 (block 402). Here, $(r_{k,c}^{avg^1}$ is the average reference signal received power (RSRP) averaged over the spectrum for user 'k' on component carrier 'c'. $l_c$ is the load on carrier c and could represent the number of users already assigned to carrier c or the traffic demand on carrier c, etc. Then, the system proceeds with step 2 if joint CC selection and scheduling do not apply (block 404), and selects secondary CCs up to the allocated limit for a new LTE advanced user based on the same criteria as for PCC in step 2 (block 406). The system proceed with step 3 in case of joint CC selection and scheduling (block 404), and performs joint secondary CC selection (for LTE advanced users) and resource scheduling (for all users) in step 3 (block 408). The process of joint CC selection and scheduling in step 3 (block 408) would vary depending on whether the users have finite user buffers or backlogged user buffers. We describe the approach for both these cases separately.

Figure 5:
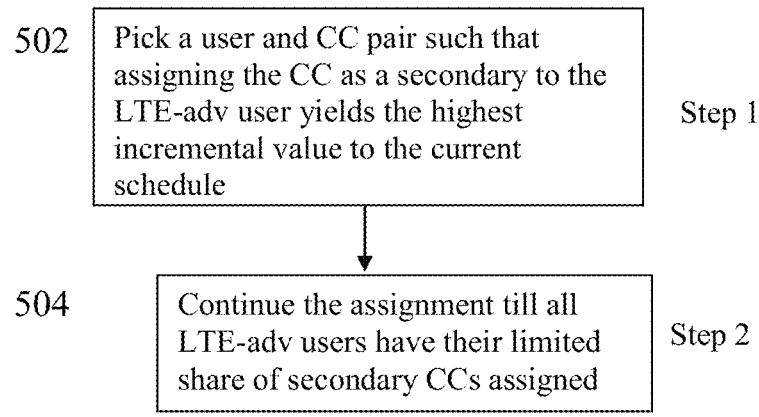
FIG. 5 depicts an approach for the joint CC selection in case of backlogged user buffers.

An approach for the backlogged user buffers is shown in FIG. 5. In step 1 (block 502), the system picks a user and CC pair such that assigning the CC as a secondary to the LTE-adv user yields the highest incremental value to the current schedule. In step 1 (block 502), the system determines the incremental value of a CC assignment to a user amounts to finding the best utility/metric (eg. weighted rate) on each resource block (RB) in a CC based on the users who are assigned to that CC and aggregating them. Further in step 1 (block 502), if the CCs that are assigned to a LTE-adv user are constrained to be contiguous, instead of assigning one CC at a time, the solution would consider all combinations (N−n+1) of 'n' CCs to an LTE-adv user in determining the best set of n−1 CCs that need to be assigned to the LTE-adv user. Here 'n' is the limit on number of secondary CCs that can be assigned to an LTE-adv user out of a total of N. Then, in step 2 (block 504), the system continues the assignment till all LTE-adv users have their limited share of secondary CCs assigned.

Figure 6:
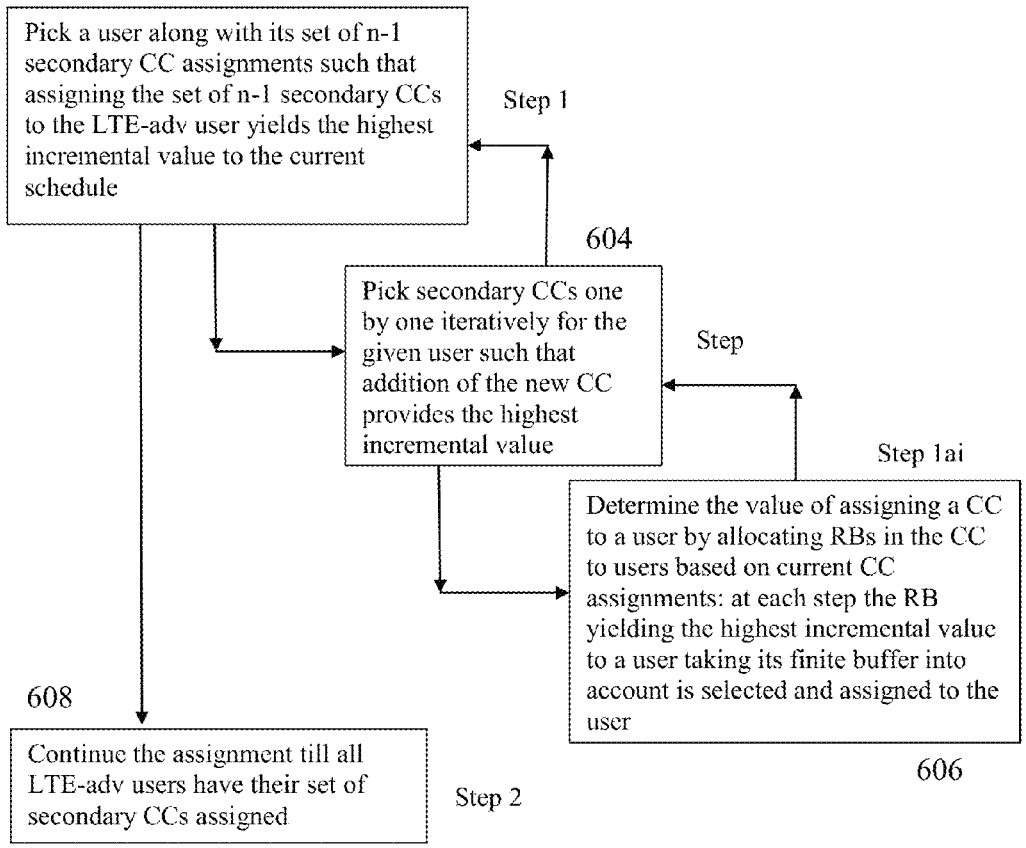
FIG. 6 depicts an approach for the joint CC selection in case of finite user buffers.

An approach for the finite user buffers is shown in FIG. 6. In step 1 (block 602), the system picks a user along with its set of n−1 secondary CC assignments such that assigning the set of n−1 secondary CCs to the LTE-adv user yields the highest incremental value to the current schedule. In step 1a (block 604), the system picks secondary CCs one by one iteratively for the given user such that addition of the new CC provides the highest incremental value. In step 1ai (block 606), the system determines the value of assigning a CC to a user by allocating RBs in the CC to users based on current CC assignments: at each step the RB yielding the highest incremental value to a user taking its finite buffer into account is selected and assigned to the user. Then, in step 2 (block 608), the system continues the assignment till all LTE-adv users have their set of secondary CCs assigned.

In this document, we have looked at the problem of energy efficient carrier aggregation for LTE-A systems. We have shown that with the help of efficiently designed joint CC selection and scheduling algorithms, one can obtain close-to the maximum scheduling performance of CA systems, while expending only half the energy for its mobile devices. In this regard, we proposed algorithms with performance guarantees under various models of contiguous and discontiguous CA as well as backlogged and finite user buffers. Our extensive evaluations validated our hypothesis as well as highlighted the performance gains of our proposed solutions over baseline schemes.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method implemented in a mobile communications system, comprising:
   selecting primary component carrier $c_p$ for a new user according to formula, $$c_p = \text{argmax}_c \frac{r_{k,c}^{avg}}{l_c}$$

where $r_{k,c}^{avg}$ is reference signal received power (RSRP) averaged over a spectrum for user k on component carrier c;
   performing joint secondary CC selection for one or more Long Term Evolution (LTE)-Advanced users and resource scheduling for one or more LTE users and said one or more LTE-Advanced users;
   wherein the performing includes:
   selecting an LTE-Advanced user according to a set of n−1 secondary CC assignments so that assigning a set of n−1 secondary CCs to the LTE-Advanced user maximizes an incremental value to an existing schedule;
   selecting each of one or more secondary CCs iteratively for a given user so that adding said each of one or more secondary CCs maximizes an incremental value to an existing schedule;
   determining the incremental value by allocating a resource block (RB) in the secondary CC to the given user based on an existing CC assignment; and
   selecting the RB so that the incremental value is maximized.

2. The method as in claim 1, wherein the performing comprises:
   selecting a pair of an LTE-Advanced user and a secondary CC so that assigning the secondary CC to the LTE-Advanced user maximizes an incremental value to an existing schedule.

3. The method as in claim 2, wherein the performing further comprises:
   continuing the assignment until all of said one or more LTE-Advanced users have a share of secondary CCs.

4. The method as in claim 1, wherein the selecting the RB is performed by taking a finite user buffer into account.

5. The method as in claim 1, further comprising:
   continuing the assignment until all of said one or more LTE-Advanced users have a set of secondary CCs.

6. The method as in claim 1, wherein the mobile communications system is a base station.

7. A mobile communications system comprising:
a first selection unit to select primary component carrier $c_p$ for a new user according to formula, $$c_p = \mathrm{argmax}_c \frac{r_{k,c}^{avg}}{l_c}$$

where $r_{k,c}^{avg}$ is reference signal received power (RSRP) averaged over a spectrum for user k on component carrier c; and
a performance unit to perform joint secondary CC selection for one or more Long Term Evolution (LTE)-Advanced users and resource scheduling for one or more LTE users and said one or more LTE-Advanced users;
wherein the performance unit selects an LTE-Advanced user according to a set of n−1 secondary CC assignments so that assigning a set of n−1 secondary CCs to the LTE-Advanced user maximizes an incremental value to an existing schedule;
wherein the performance unit further selects each of one or more secondary CCs iteratively for a given user so that adding said each of one or more secondary CCs maximizes an incremental value to an existing schedule;
wherein the performance unit further determines the incremental value by allocating a resource block (RB) in the secondary CC to the given user based on an existing CC assignment, and selects the RB so that the incremental value is maximized.

8. The mobile communications system as in claim 7, wherein the performance unit selects a pair of an LTE-Advanced user and a secondary CC so that assigning the secondary CC to the LTE-Advanced user maximizes an incremental value to an existing schedule.

9. The mobile communications system as in claim 8, wherein the performance unit further continues the assignment until all of said one or more LTE-Advanced users have a share of secondary CCs.

10. The mobile communications system as in claim 7, wherein the selecting the RB is performed by taking a finite user buffer into account.

11. The mobile communications system as in claim 7, further performance unit further continues the assignment until all of said one or more LTE-Advanced users have a set of secondary CCs.

12. The mobile communications system as in claim 7, wherein the mobile communications system is a base station.

* * * * *